United States Patent [19]
Kuftedjian

[11] Patent Number: 6,018,745
[45] Date of Patent: Jan. 25, 2000

[54] COUPLED FILE ACCESS

[75] Inventor: Ohaness Kuftedjian, Irvine, Calif.

[73] Assignee: Ericsson Inc., Research Triangle Park, N.C.

[21] Appl. No.: 08/996,940

[22] Filed: Dec. 23, 1997

[51] Int. Cl.[7] .................................................. G06F 17/30
[52] U.S. Cl. ........................ 707/200; 707/201; 707/10; 707/8
[58] Field of Search .................................. 707/8, 10, 900, 707/901

[56] References Cited

U.S. PATENT DOCUMENTS

| | | | |
|---|---|---|---|
| 5,664,178 | 9/1997 | Sinofsky | 707/100 |
| 5,721,904 | 2/1998 | Ito et al. | 707/8 |
| 5,729,733 | 3/1998 | Sharif-Askary | 707/8 |
| 5,857,187 | 1/1999 | Uenoyama et al. | 707/8 |

*Primary Examiner*—Paul R. Lintz
*Attorney, Agent, or Firm*—Jenkens & Gilchrist P.C.

[57] ABSTRACT

A computer network system and technique enables linked files, such as those that are physically distinct but data dependent, to be simultaneously accessed. Elements, whether they are realized in hardware or software, are located in both the servers and the clients in a network. A remote data server (RDS) element in a server receives coupled file access (CFA) requests from clients. A corresponding element at the client includes the names of the linked files, a file access priority, and a file access communication timeout in the CFA request. The RDS element, upon accepting a CFA request, initializes a CFA thread. A CFA thread maps the requested files into virtual memory. The server, through the CFA thread, can then proceed to provide the requisite access from the virtual-memory-mapped images. Other elements within the network can therefore access the same files from the same or another virtual memory mapping. The coupled file accessing prevents mismatches of linked files.

32 Claims, 6 Drawing Sheets

COUPLED FILE ACCESS

DESCRIPTION OF RELATED ART AND OBJECTS OF THE INVENTION

In many offices and universities around the world, computer networks connect each computer to every other computer in an associated system. Connecting computers provides many benefits. First, it enables fast communication between and among users, e.g., e-mail. Second, software programs can be stored at a central computer and retrieved by individual computers as needed to thereby reduce memory storage requirements at the individual computers. Third, software programs can be installed and upgraded over the network. This eliminates the need for a person to physically visit each computer to install or upgrade a program. Fourth, files can be shared between and among various computer users. In other words, one person can work on a document and then save or store it at a central computer. A second person can then request the document from the central computer and continue working on it. In short, computer networks are designed to empower computer users to transfer information between and among users to enable the sharing of files and programs with one another.

Referring first to FIG. 1, a typical computer network system 100 is illustrated. The above-described features of computer networks are realized with network systems composed of three principle parts. The first part is composed of one, two, a hundred, or even more computers that are directly interacted with by the computer users. Each computer user and/or corresponding computer are individually or as a pair referred to as a client. A first client 105 and a second client 110 are shown in FIG. 1. The second part of computer networks is composed of one or more servers, which can store central files and programs that are to be shared throughout a portion or all of the network. A server 115 is also shown. The first client 105, the second client 110, and the server 115 are linked via a third part, the network connections 120. The network connections will be generally referred to by the numeral "120" and specifically referred to by "120'" and "120''", as necessary.

Each of the first client 105, the second client 110, and the server 115 has an operating system, which is the primary software for controlling each computer. In the server 115, a server operating system (OS) 125 controls the operations, including the input/output functions, of the server 115. One of the server's 115 input/output functions is the facilitation of file access, such as the transferring of files. A first file 130 and a second file 135 are stored at the server 115.

The first client 105 can request by way of its own operating system, and via a network connection 120', the first file 130 from the server 115 by way of the server operating system 125. The server operating system 125 transfers a copy of the first file 130 over the network connection 120' to the first client 105. The first client 105 then has a first file copy 140 in its memory. Meanwhile, the second client 110 can also have requested a general file 145 from the server 115. Unfortunately, attempting to satisfy requests from both the first client 105 and the second client 110 can create problems, such as unnecessary response delays and even uncorrelated database data.

For example, inaccurate file data can result when two files are physically separate within the server 115 but whose data contents are mutually dependent. Databases typically have separate files for the actual database data information and for the database index information. The database data is composed of, for example, the names, addresses, etc. of customers while the database indexes would be composed of the corresponding index information used by the computer to facilitate searching the customer database. In such a database situation, the first file 130 may contain the database data information, and the second file 135 will contain the corresponding database index information. To search the database data information, the first client 105 will need to access, e.g., retrieve for reading, both the first file 130 and the second file 135.

In prior art networks, the clients and servers must rely on the underlying operating systems for file retrieval, or more generically, file access operations. With respect to FIG. 1, the operating system in the first client 105 must make two separate requests for file transfers, and the server operating system 125 of server 115 must execute two separate file transfers (a double file transfer) to the first client 105. These two file transfers, however, do not occur simultaneously, which can cause mismatched file transfers and corrupted data.

Corrupted file data can occur in the following double file transfer situation. Referring again to FIG. 1, the first file 130 and the second file 135 are defined to be linked, dependent files of database data information and database index information, respectively. The first client 105 uses its operating system to transmit a request for the first file 130 over the network connection 120' to the server operating system 125 of the server 115. This transfer may take anywhere from less than a second to many minutes depending on, among other factors, the size of the first file 130, the speed at which the first client 105 can receive data, the speed at which the network connection 120' can transfer data, the length of network connection 120', the number of intervening nodes (e.g., from routers or switches) along network connection 120', and the amount of network traffic.

Once the transfer is complete, the first client 105 has received the first file copy 140. The file is termed here a copy, but it is in one sense the original because the first client 105 may alter the file, which could thus render the first file 130 obsolete. In this instance, the first file 130 is effectively being eliminated, e.g., by being marked invalid, at the server 115 by being moved to become first file copy 140 at the first client 105. Once the first client 105 has successfully received the first file copy 140, transfer of the second file 135 can begin (Assuming that, at some point, the first client's 105 operating system has transmitted a second file request to the server operating system 125 for the second file 135).

However, during the transfer of the first file 130, whether it takes less than a second or several minutes, another client may interfere with the double file transfer by requesting the physically separate, but data dependent, second file 135. For example, the second client 110 may use its operating system to transmit a request for the second file 135 over a network connection 120'' to the server operating system 125 of the server 115. The server 115 transfers the second file 135 along the network connection 120'' to the second client 110. Once the second client 110 has received the second file 135 (the received file is represented by the general file 145 in FIG. 1), it will proceed to alter the second file copy (general file) 145. This alteration modifies the database index information and results in mismatched information between the data information in first file copy 140 and the index information in the second file copy (general file) 145. Thus, the database information becomes corrupted. The database can be similarly corrupted if the first and second clients 105 and 110 are merely trying to update (a modification access) linked files without actually transferring the files.

As another example, response delays can result when computer network system 100 is composed of a heterogenous mixture of network types. Though the network connections 120 are shown as direct connections between the server 115 and the first and second clients 105 and 110, computer networks are not so limited. The network connections 120 can include several devices along their lengths. For example, other clients can be positioned between the server 115 and the first and second clients 105 and 110 depending on the network topology. Routers, switches, etc. that lead to other networks can also be placed along the network connections 120. Moreover, network connection 120' and 120" can differ from each other. For example, network connection 120' can be part of a wide area network (WAN) while network connection 120" can be part of a local area network (LAN).

These different possibilities for the network connections 120 lead to differing network environments for the first client 105 and the second client 110. If, for example, network connection 120' represents a WAN and network connection 120" represents a faster LAN, the first client 105 will not be able to transfer data as fast as the second client 110. Consequently, the first client 105, which has the slower connection to the server 115, may take several minutes to complete a double file transfer while the second client 110, which has the faster connection to the server 115, should be able to complete a double file transfer in several seconds. In prior art systems, however, the fast-connected second client 110 can still require several minutes to complete the double file transfer because the slow-connected first client 105 has created so much network congestion. These performance-degrading, congestion-induced response delays are further intensified as the number of devices on the network that are requesting double file transfers increases.

The current invention addresses these (and other) deficiencies in the prior art by achieving the following (and other) objects of the invention:

An object of the invention is to provide actually or logically simultaneous coupled file accesses (CFAs).

Another object of the invention is to provide the ability for any element on a network to simultaneously transfer two physically different files from a server to a client.

A further object of the invention is to permit any number of elements on a network to concurrently retrieve, store, or modify any coupled files on a server.

A still further object of the invention is to support heterogeneous fast and slow network environments.

Yet another object of the invention is to implement a CFA system that can bypass or work in conjunction with any security restrictions that a network operating system imposes.

SUMMARY OF THE INVENTION

These and other objects of the invention are achieved with a computer network system and technique that enables linked files to be simultaneously accessed, e.g., transferred or modified. Files that may be physically separate, but are data dependent, are considered linked files; examples of linked files are database data files and database index files. In prior art computer networks, accessing linked files (i) requires two separate file access requests, (ii) risks data mismatches, and (iii) can cause unnecessary response delays in heterogeneous networks. The current invention overcomes these (and other) deficiencies in the prior art to minimize the effects of network bottlenecks on individual clients.

According to a preferred embodiment, the current invention improves the performance of networks that are composed of servers, which centrally store network data, and clients, which must access the centrally stored data. A network according to the current invention can be composed of many different network implementations. Consequently, different clients may be able to connect to the server at different bandwidths. The current invention accommodates such different bandwidths.

According to a preferred embodiment, elements, which can be implemented in hardware or software, reside on both the servers and the clients in the network. A remote data server (RDS) element resides on the servers, and operator workstation (OWS) or personal screen call (PSC) elements, for examples, resides on the clients. Clients that wish to access linked files do so through communication between their particular element and the RDS element of the server. Linked files can be requested with one coupled file access (CFA) request.

CFA requests are preferably composed of three parts: (1) the names of the linked files, (2) a file access priority, and (3) a file access communication timeout. The RDS element receives CFA requests. The RDS element (via, e.g., a CFA request queuing thread) addresses a CFA request based on its priority level as compared to the priorities of other CFA requests. The RDS element also determines whether another CFA request for the same client is in progress. If not, the CFA request is entered into a CFA list and a CFA thread is created to service the CFA request.

The CFA thread opens an existing or creates a new file mapping for the linked files named in the CFA request. A file mapping is created when images of the requested files are mapped into virtual memory. The CFA thread can effectuate the access (according to the file access priority of the CFA request) from the virtual memory mapped images. The virtual memory images are preferably a "snapshot" of the linked files. Therefore, the CFA thread can continue to transfer the linked files based on the memory mapped images while another CFA thread for a different CFA request for a different client provides access to the linked files simultaneously.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, software elements, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and software code are omitted so as not to obscure the description of the present invention with unnecessary detail.

A preferred embodiment of the present invention and its advantages are best understood by referring to FIGS. 1–6 of the drawings, like numerals being used for like and corresponding parts of the various drawings.

Figure 1:
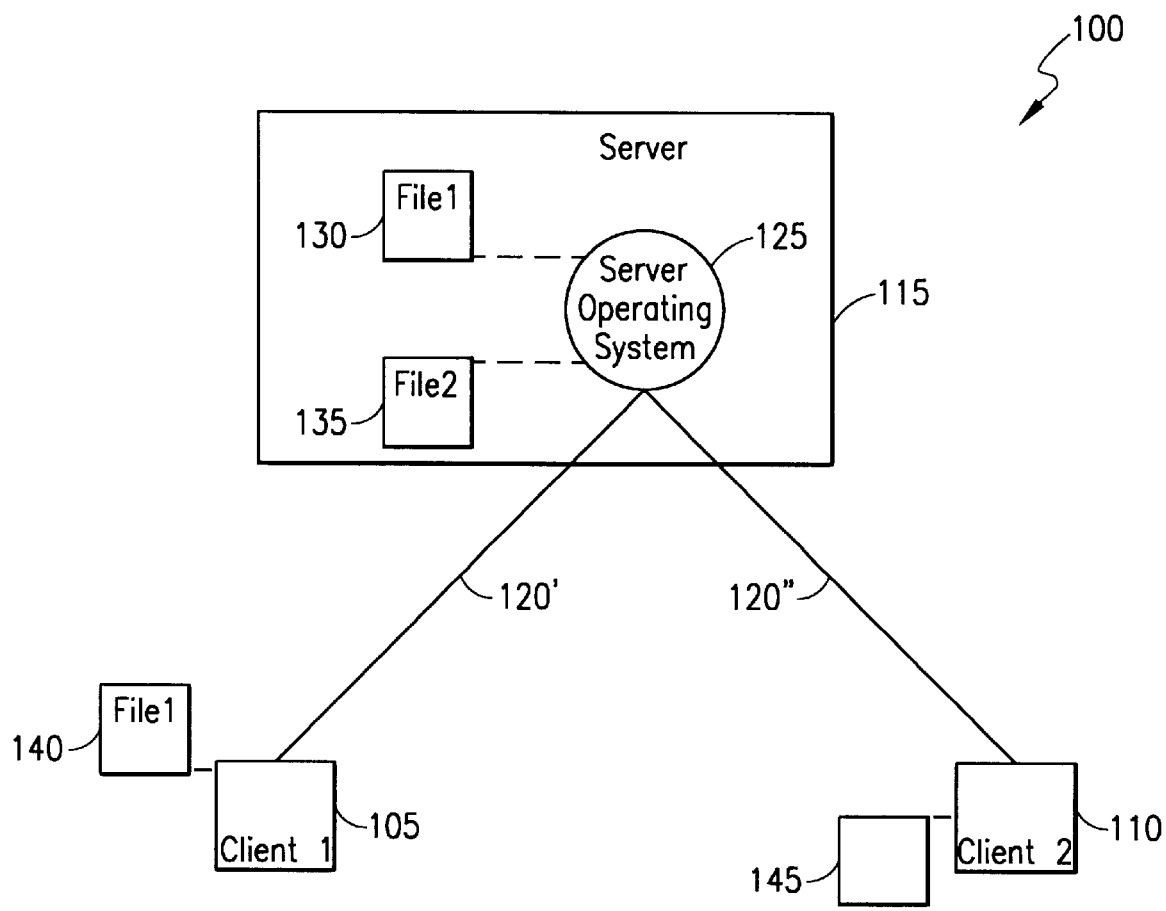
FIG. 1 illustrates a typical computer network that enables clients to access files on a server.
Figure 2:
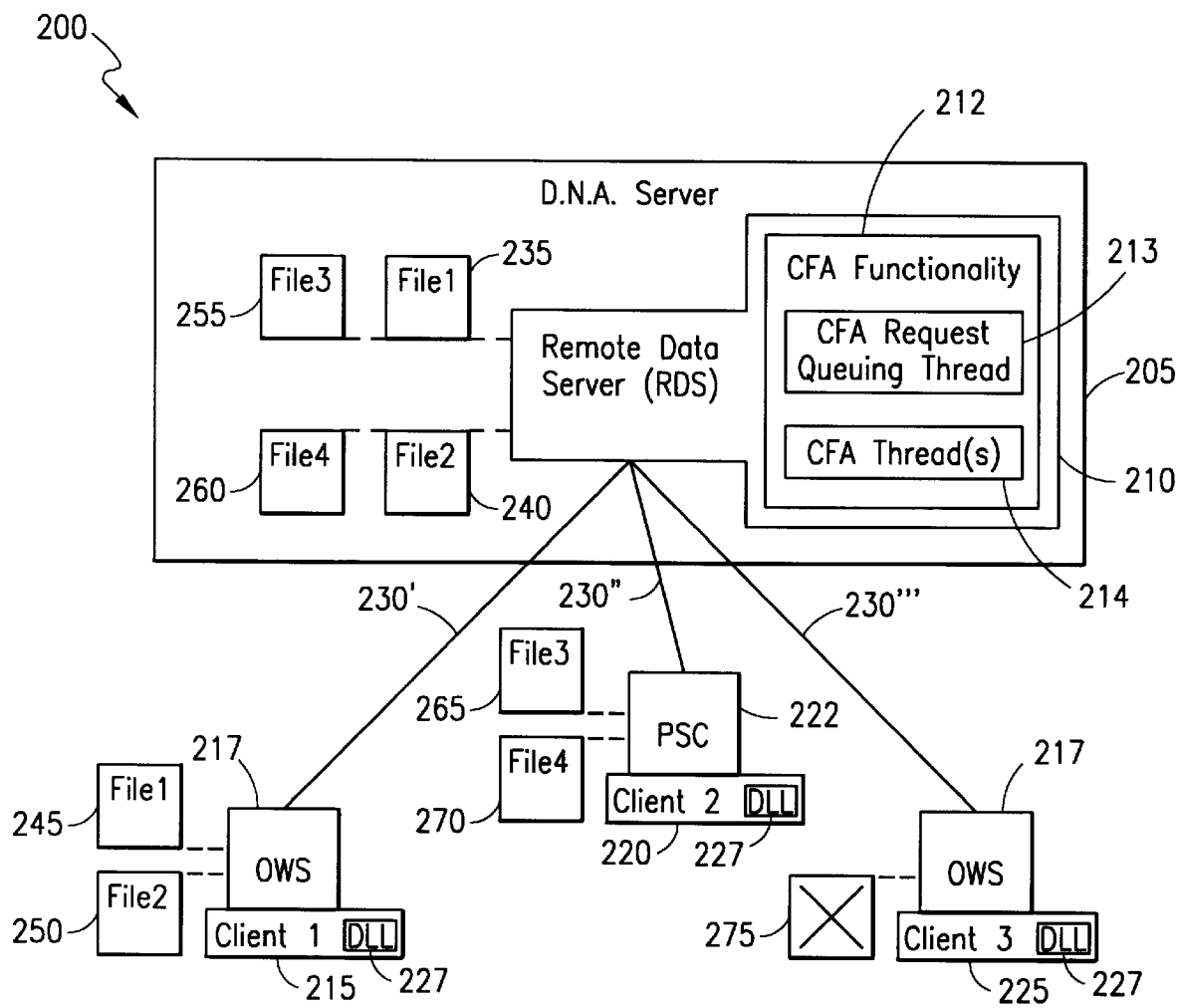
FIG. 2 illustrates a computer network according to the current invention that enables clients to access files on a server.

FIG. 2 illustrates a computer network 200 that enables clients to access files located at a server according to the current invention. Though only one server and three clients are shown in the exemplary computer network 200, it is to be understood that a network with any number of servers, clients, routers, switches, bridges, etc. can benefit from the current invention. Furthermore, exemplary computer network 200 can be a heterogenous network and therefore composed of a network of networks, where each network within exemplary computer network 200 has its own protocols, topologies, etc. Also, network connections 230 can represent a WAN connection, a LAN connection, a dial-up modem connection, etc.

In FIG. 2, the computer network 200 is shown with a Dynamic Network Administration (DNA) server 205 that includes a remote data server (RDS) element 210, a first client 215, a second client 220, and a third client 225. Both the first client 215 and the third client 225 include an operator workstation (OWS) element 217, and the second client 220 includes a personal screen call (PSC) element 222. The first client 215, the second client 220, and the third client 225 are in communication with server 205 via network connections 230', 230'', and 230''', respectively. Also, a first file 235, a second file 240, a third file 255, and a fourth file 260 are originally stored at the server 205.

PSC element 222 is preferably an application that integrates a personal computer user's personal directory with a corporate directory. Such an application enables the user to know who is calling and to call a person by entering that person's name into the personal computer. OWS element 217 is preferably an application that integrates computer features (e.g., a search directory) with telephone features (e.g., voice mail). Furthermore, the linked database files preferably correspond to a phone directory that can be transferred to a user's personal computer in case the network fails. However, the invention is not so limited to these preferred embodiments.

The coupled file access (CFA) functionality 212 of the current invention enables two related, but separate, files to be accessed reliably, expeditiously, and/or concurrently. An access encompasses the myriad of possible file functions in a computer network such as loads, stores, reads, writes, retrievals, sends, transfers, etc. For example, the CFA functionality 212 of the current invention enables linked files to be transferred between network elements simultaneously.

In other words, a first network element's process of transferring two files cannot be interrupted or interfered with by a second network element's attempted access, e.g., retrieval or modification, of one or both of the two related files. The RDS element 210 is provided in the computer network 200 for controlling coupled file access (e.g., CFA functionality 212) to network objects, which are components on the network that are not solely owned by one network element. Each network control element, such as an OWS or PSC element 217 or 222, can interface with the RDS element 210 to accomplish CFAs. Note that although the CFA functionality 212 is pictured within the RDS element 210, the CFA functionality 212 is preferably distributed throughout the network to devices that access files (e.g., first, second, and third clients 215, 220, and 225) as well as those that can provide the requested access (e.g., server 205).

Also, as part of the CFA functionality 212, a CFA request queuing thread 213 and CFA thread 214 are pictured. Each is further described hereinbelow in conjunction with FIGS. 4A–6. Note that although only one CFA thread 214 is included in FIG. 2, many CFA threads 214 may exist at once according to the current invention.

The RDS element 210, OWS elements 217, PSC element 222, and equivalent elements are preferably implemented in software. For example, they can be software modules located in each network device, e.g., the server 205 and the second client 220, that needs to access coupled files. Specifically, Windows NT (a trademark of Microsoft Corp. and available from same) can be selected as the operating system in the computer network 200. In this instance, network connections 230 are preferably Windows NT Named Pipe Connections. In general though, network connections 230 can be any logical or physical channel that is capable of data propagation.

Though the CFA functionality 212 of the current invention is preferably implemented in software, it can also be implemented in hardware, firmware, etc. When the invention is implemented in software, the software can be stored in any type of computer-accessible memory, e.g., volatile or nonvolatile, solid-state or not, fixed or removable media, etc. Also, the memory can be, e.g., RAM, ROM, EEPROM, magnetic, optical, DVD, etc., or a yet-to-be-developed equivalent. It should be noted that the CFA functionality 212 of the current invention has a myriad of practical applications. To wit, the CFA functionality 212 prevents the corruption of database information in the computer network arts.

The OWS and PSC elements 217 and 222 of the first, second, and third clients 215, 220, and 225 interface with the RDS element 210 of the server 205 in the following manner for a transfer access. When an OWS element 217 from either the first or third client 215 or 225 desires to retrieve two coupled files from the server 205, the relevant OWS element 217 sends a request to the RDS element 210 by way of the file access dynamic link libraries (DLL) 227 that reside on the relevant client. The request is transferred over the relevant network connection (either 230' or 230''' in this OWS element 217 example). The CFA request from the OWS element 217 to the RDS element 210 specifies the information illustrated in FIG. 3A.

Figure 3A:
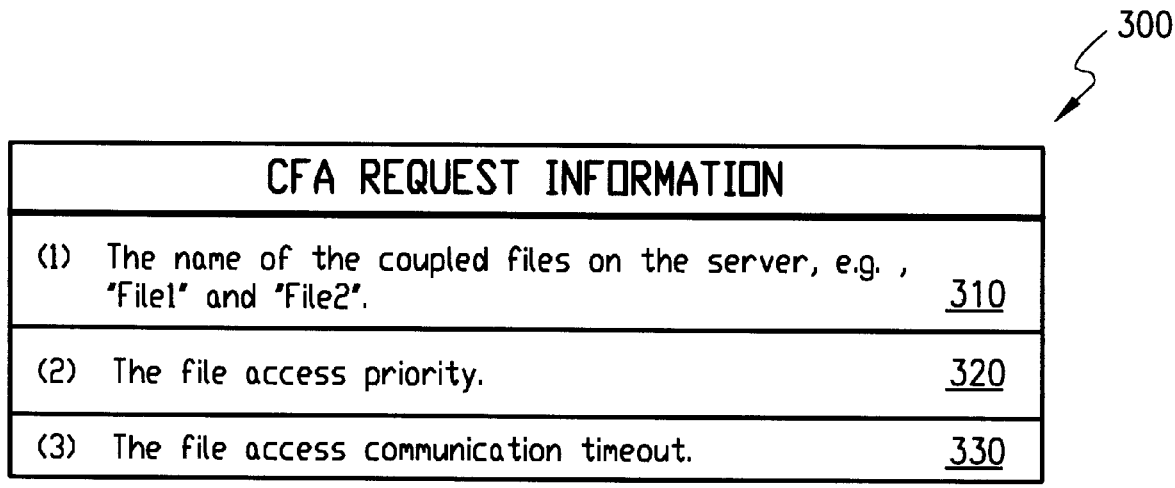
FIG. 3A illustrates the information contained in a CFA request according to the current invention.

Referring now to FIG. 3A, a CFA request information table 300 is pictured. The names of the coupled files 310, the file access priority 320, and the file access communication timeout 330 are items in CFA requests according to the current invention. With regard to the names of the coupled files 310, it should be recognized that more than two files may be coupled and that the CFA functionality 212 of the current invention includes accessing three or more coupled files under the same or similar CFA system. Multiple file names need only be specified. With regard to the file access communication timeout 330, the file access communication timeout preferably defaults to one minute if no timeout is specified. With regard to the file access priority 320, the file access priority is preferably one of four possible numerical values as listed in Table 1.

TABLE 1

| Priority Label | Numerical Value |
| --- | --- |
| EMERGENCY_PRIORITY | 0x10 |
| HIGH_PRIORITY | 0x20 |
| MEDIUM_PRIORITY | 0x30 |
| LOW_PRIORITY | 0x40 |

It should be clarified that both the number of priority levels and each level's specific numerical value are exemplary only, and they should not be taken to be limiting of the current invention. The file access priority preferably defaults to MEDIUM_PRIORITY if no priority level is specified.

Within the presently preferred embodiment, it is contemplated to expand the number (enable the specification of a wider range) of priority levels beyond four when four is not satisfactory. This expansion can be accomplished by either adding or subtracting values to or from the base priorities listed in Table 1 as follows: XXXX_PRIORITY +/−0x8. For instance, 0x8 can be subtracted from all four priority levels in Table 1 and also added to the "LOW_PRIORITY" numerical value. This produces nine different priority levels with numerical values from 8 to 48 (in hexadecimal).

Figure 3B:
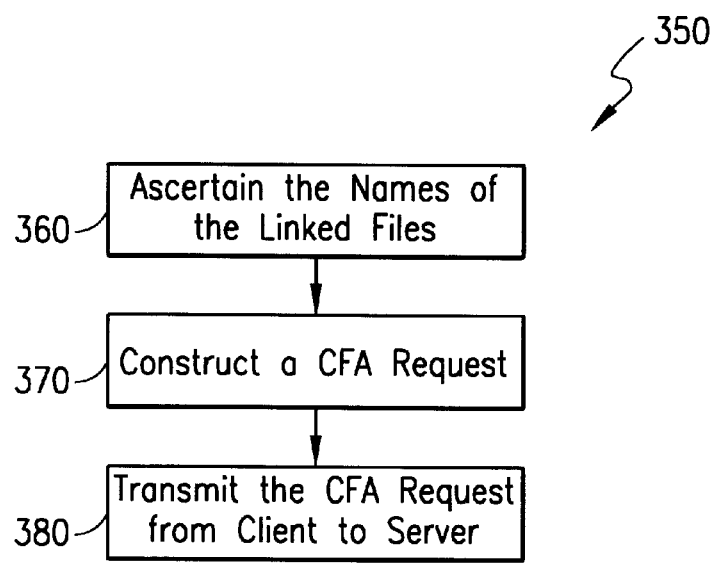
FIG. 3B illustrates in flowchart form a method of initiating a CFA request according to the current invention.

Referring now to FIG. 3B, a flowchart 350 illustrates a method of initiating a CFA request according to the current invention. After the names of the linked files are ascertained by the client in Step 360, the client constructs a CFA request in Step 370 in accordance with the three items listed in the CFA request information table 300. The client transmits the CFA request to the server in Step 380.

Referring now back to FIG. 2, the PSC element 222 of the second client 220 executes the CFA functionality 212 similar to the OWS elements 217 of the first and third clients 215 and 225. Hence, if the PSC element 222 of the second client 220 wishes to transfer copies of the coupled files third file 255 and fourth file 260, then the PSC element 222 would transmit a request in accordance with FIG. 3A over network connection 230" to the RDS element 210. Only one requested file transfer is needed for the two files. During the transfer, no other network element will be permitted to interfere with the CFA to the extent of actually corrupting any files. The coupled files may not necessarily be transferred simultaneously. However, they are transferred logically simultaneously in the sense that the system and technique of the current invention prevents (i) a haphazard interruption of the transferring and (ii) a corruption of third and fourth files 255 and 260. Once the CFA is complete, the second client 220 can store locally the third file copy 265 and the fourth file copy 270. (It is reiterated that though the term "copy" is used, the files at the second client 220 may be the only valid versions in the computer network 200.)

Another example with reference to FIG. 2 is provided. Corruption of file data could occur in a prior art double file transfer situation as explained above with reference to FIG. 1. With the CFA functionality 212 of the current invention, on the other hand, no corruption will occur. The first file 235 and the second file 240 are defined to be dependent files of database data information and database index information, respectively.

If the first client 215 wishes to receive the first file 235 and the second file 240 from the server 205, the OWS element 217 of the first client 215 initiates a CFA request in accordance with FIG. 3B as described hereinabove, which includes the items in the CFA request information table 300 along with a priority from Table 1, to the RDS element 210 over the network connection 230'. If there is no conflict with other access requests (be they CFAs or standard stores, transfers, etc.), the RDS element 210 prepares to implement the transfer of the first and second files 235 and 240. Conflicts can arise, for example, if another element or device on the network has locked the relevant files. A network-level mutex is described in a related U.S. patent application Ser. No. 09/014,504, network nutex, which is hereby incorporated by reference in it entirety herein. A conflict can also arise, as another example, when a CFA requesting element already has a CFA request in progress (as explained hereinbelow with respect to FIG. 5A).

Assuming now (i) that the third client 225 wishes to receive the second file 240 via the network connection 230'" and (ii) that a transfer request or an update (file modification) request (either CFA or regular) is made during the CFA requested by the OWS element 217 of the first client 215, the current invention prevents any file corruption. According to a preferred embodiment of the current invention, the RDS element 210 maps a copy of the first file 235 and the second file 240 from a storage device into virtual memory.

Figure 4A:
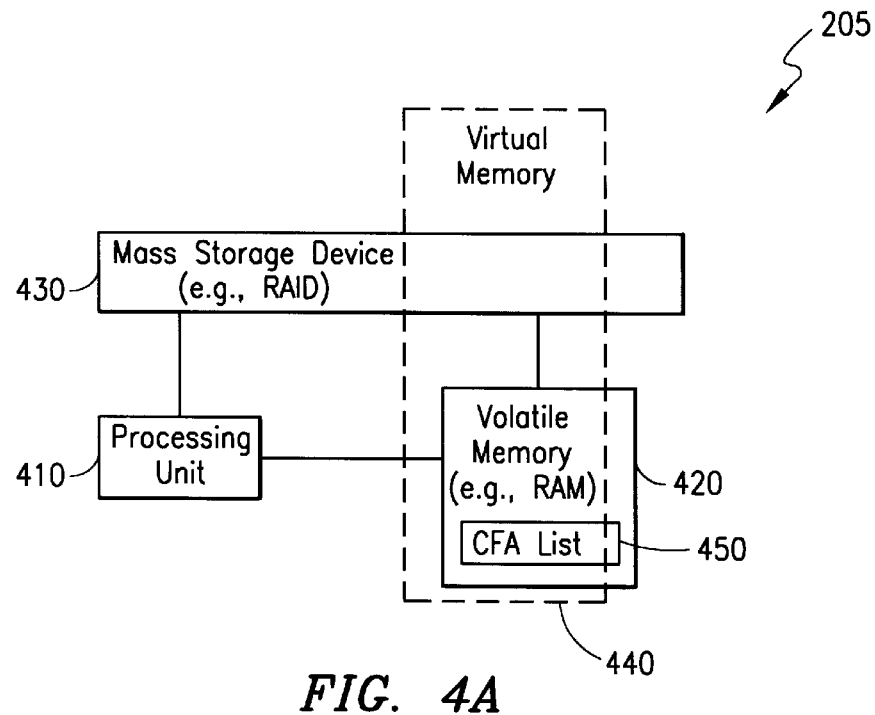
FIG. 4A illustrates a preferred embodiment of the memory configuration for a server according to the current invention.

Referring now to FIG. 4A, a preferred embodiment of the memory configuration for the server 205 is illustrated. A processing unit 410, a volatile memory 420, and a mass storage device 430 are shown interconnected. The volatile memory 420 can be, for example, any kind of random access memory (RAM). The mass storage device 430 can be, for example, a tape drive, a redundant array of independent disks (RAID), etc. The customer database can be stored on the mass storage device 430. A CFA list 450, which is described in detail hereinbelow in conjunction with FIGS. 5A and 5B, can be stored in the volatile memory 420. Upon receipt of the CFA request from the first client 215, the RDS element 210 creates a "snapshot" image of the first and second files 235 and 240 in virtual memory 440. Virtual memory is preferably directly addressable memory (4 GB in a Windows implementation) in which the data can be swapped to and from, for example, the volatile memory 420 and the mass storage device 430. Note that FIG. 4A is only exemplary of virtual memory, and the invention encompasses virtual memory in general.

Figure 4B:
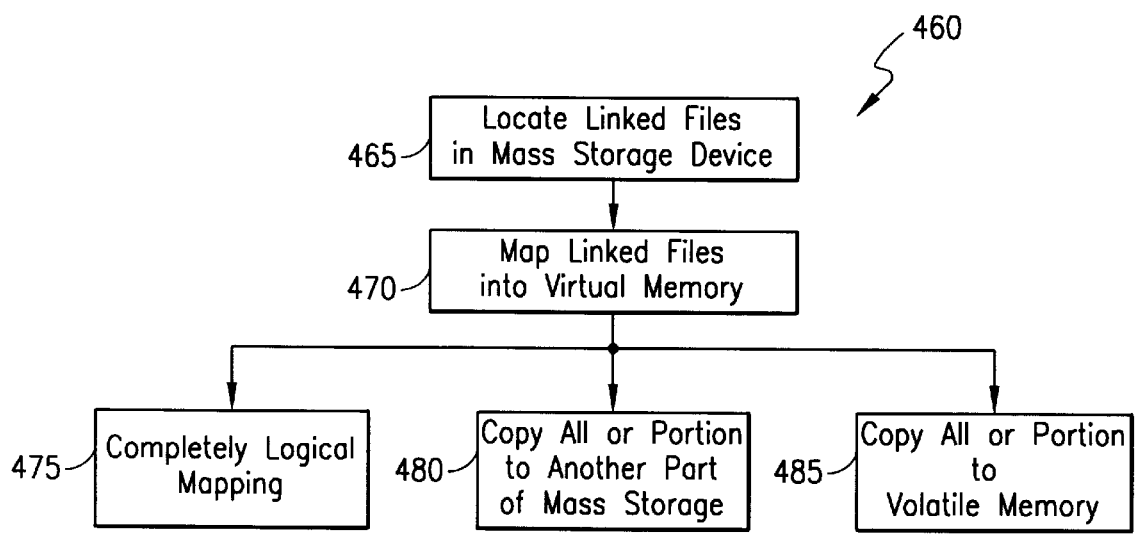
FIG. 4B illustrates in flowchart form a file mapping procedure according to the current invention.

Referring now to FIG. 4B, a file mapping procedure is illustrated in flowchart form at 460. Initially, the CFA functionality 212 locates the linked files, which were identified in the names of the coupled files 310, in the mass storage device 430 in Step 465. The linked files, e.g., the first and second files 235 and 240, are mapped in Step 470 into virtual memory 440. This mapping can be effectuated in many ways. For instance, in Step 475 the mapping is illustrated as being entirely logical. In this instance, the data in the linked files are not physically moved, but their current physical location on the mass storage device 430 is assigned to virtual memory. In a preferred embodiment, however, all or a portion of the data in the linked files is copied (i) to another part of the mass storage device 430 (Step 480), (ii) to the volatile memory 420 (Step 485), or (iii) a combination of both. Advantageously, copying the linked files provides an instantaneous "snapshot" of the requested files as they exist at the time of the request.

For each CFA request, the CFA functionality 212 of the RDS element 210 initializes a CFA thread 214. The CFA thread 214 either opens an existing file mapping or creates a new file mapping. An existing file mapping can often be opened when a prior request for the requested linked files is still being processed. A new file mapping is generally required when either (i) the CFA request constitutes the first request for the linked files or (ii) a prior file mapping of the requested linked files was updated (existing file mapping was altered) by the prior CFA request.

The CFA functionality 212 example above, in which access to the first and second files 235 and 240 is requested by the OWS element 217 of the first client 215, is now continued. From the mapped view of the files in the virtual memory 440, the CFA thread 214 provides access to (e.g., transfers) the first and second files 235 and 240 to the requesting OWS element 217 of the first client 215. Therefore, when the third client 225 wishes to receive the second file 240, its request will not interfere with the CFA request of the first client 215 because the image of the requested first and second files 235 and 240 in the virtual memory 440 will not be affected. Hence, no mismatching of files will occur.

Figures 5A, 5B:
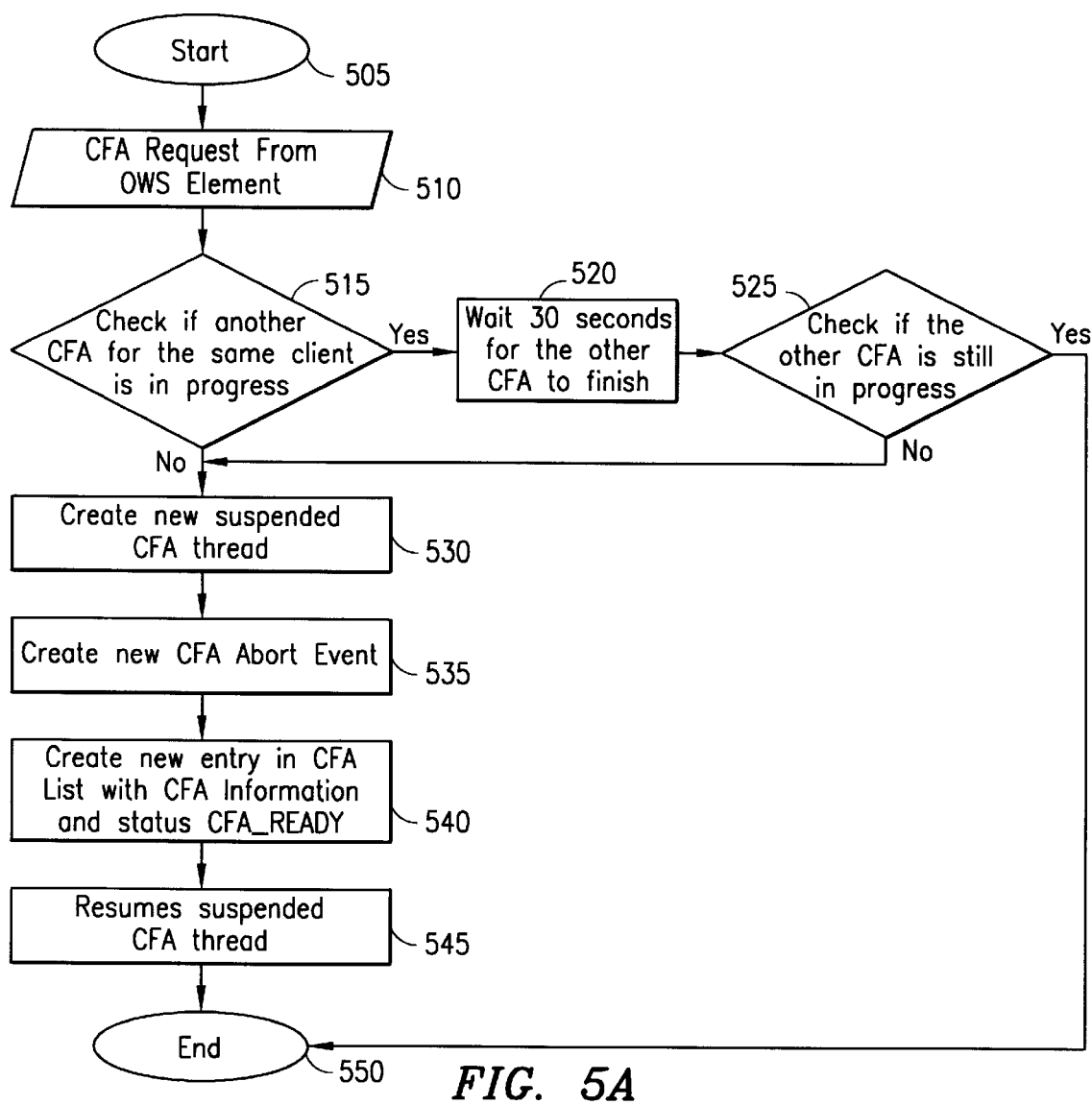
FIG. 5A illustrates in flowchart form a process that a remote data server (RDS) element undertakes upon receipt of a coupled file access (CFA) request according to the current invention.
FIG. 5B illustrates an example entry in a CFA list according to the current invention.

Referring now to FIG. 5A, a flowchart illustrates a process that the CFA functionality 212 of the remote data server (RDS) element 210 undertakes upon receipt of a coupled file access request. The start of the process is represented by Step 505. It should be noted that the process in FIG. 5A can be implemented with a thread, e.g., the CFA request queuing thread 213. In Step 510, the RDS element 210 receives a CFA request from a network element, such as the OWS element 217 at the first client 215. The RDS element 210 (or, more specifically in a preferred embodiment, the CFA request queuing thread 213) determines whether another CFA request for the same client, such as the first client 215, is in progress at Step 515. If another CFA request for the same client is in progress, the RDS element 210 waits at Step 520 for a period of time, preferably 30 seconds, for the other CFA to be completed. After the period of time has elapsed, it is determined whether the other CFA is still pending at Step 525. If the other CFA is still pending, then the requested CFA is aborted, and the process ends at Step 550; otherwise, the process continues with Step 530. Likewise for Step 515, a negative response (another CFA for the same client is not in progress) directs the process to Step 530.

At Steps 530 and 535, the RDS element 210 creates a new suspended CFA thread 214 and a new CFA abort event to start a new CFA functionality 212 session. The RDS element 210 creates at Step 545 a new entry in the CFA list 450, as described hereinbelow in conjunction with FIG. 5B, with the CFA request information (300) from the CFA request and with a status of CFA_READY. The suspended CFA thread 214 is resumed at Step 545, which is followed by the concluding Step 550.

The CFA list enables the RDS element 210 to equitably complete CFA requests from many different network elements. For each item in the CFA list 450, there is a corresponding CFA thread 214 being executed within the operating system of the server 205. FIG. 5B exemplifies one entry in the CFA list 450.

In FIG. 5B, a CFA list information table 560 is illustrated. The list preferably includes a client identification 565, a CFA request information 570, and a CFA request status 575 category for each CFA entry. The client identification 565 can be any indicator used in the computer network 200 to identify one device to another. The CFA request information 570 mirrors the information described above with reference to FIG. 3A. The CFA request status 575 can be either "CFA_READY" as explained hereinabove with reference to FIG. 5A or "CFA_IN_PROGRESS" as explained below with reference to FIG. 6. The exemplary entry 580 corresponds to the current example and includes "First Client 215" in the client identification 565 category.

Figure 6:
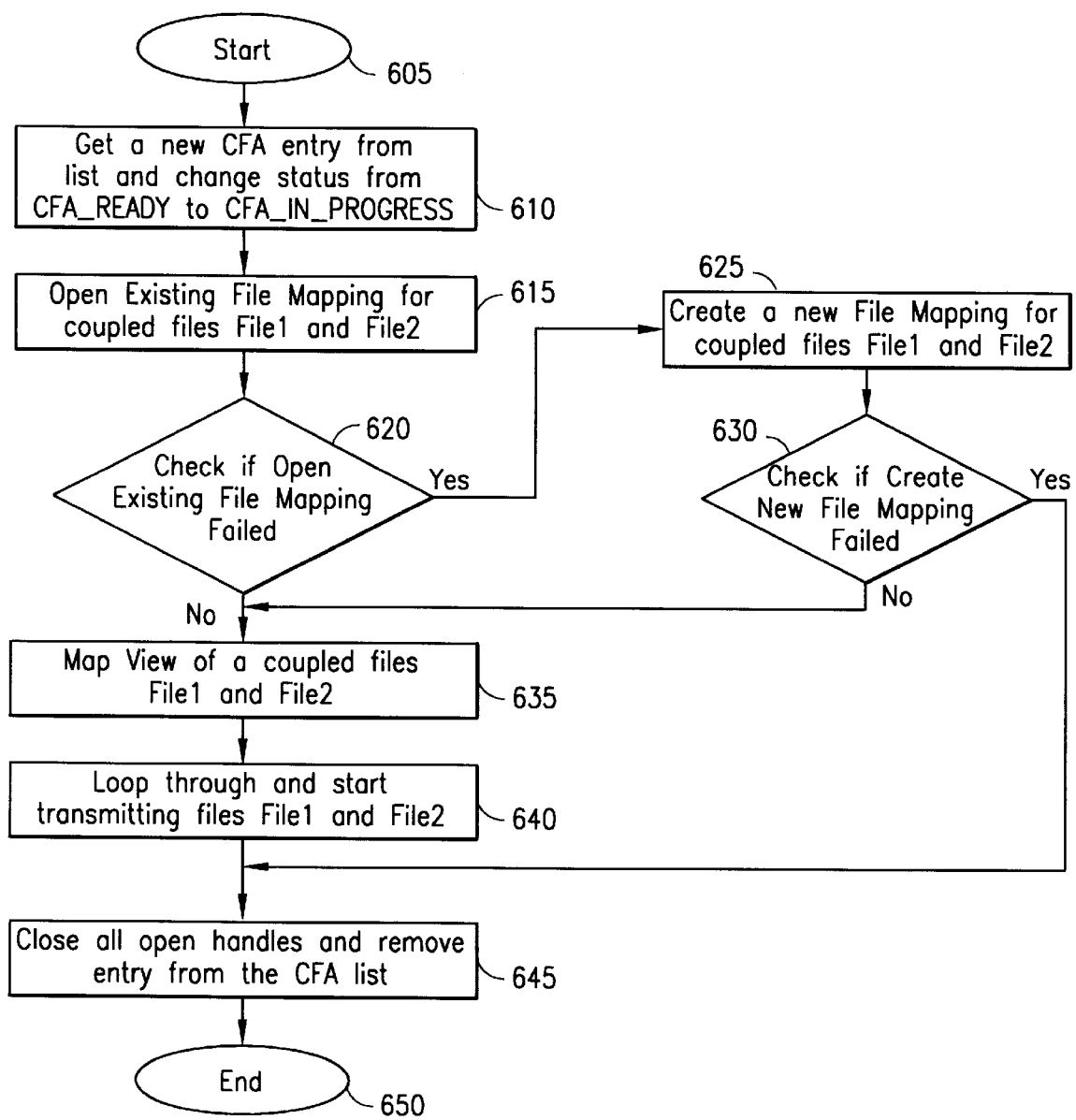
FIG. 6 illustrates in flowchart form a process that an RDS's CFA thread undertakes to transmit coupled files to a requesting network element according to the current invention.

Referring now to FIG. 6, a flowchart illustrates a process that the CFA functionality 212 of the RDS element 210 undertakes to transmit coupled files to a requesting network element. The process begins at Step 605. The CFA request queuing thread 213, or equivalent, addresses the CFA list (as explained with reference to FIG. 5B hereinabove) in Step 610 to find a new CFA entry with a CFA request status of "CFA_READY". Step 610 is completed by replacing the status "CFA_READY" with "CFA_IN_PROGRESS". An initialized CFA thread 214 attempts to open an existing file mapping in Step 615 for the coupled files first file 235 and second file 240. A determination is made by the CFA thread 214 at Step 620 whether or not the opening of the existing file mapping failed. In other words, it is determined whether a suitable (e.g., valid at the time of the request) image of the first and second files 235 and 240 already exists in the virtual memory 440.

If the attempt to open an existing file mapping failed, the CFA thread 214 attempts at Step 625 to create a new file mapping for the coupled files first file 235 and second file 240. A determination is made at Step 630 whether or not the creation of a new file mapping failed. If the creation did fail, the process proceeds to Step 645, which is described hereinbelow. If the creation of a new file mapping did not fail, the process continues with Step 635, which is also described hereinbelow.

Returning to Step 620, if the determination is that the opening of the existing file mapping did not fail, the process continues with Step 635. Regardless of the route taken to reach Step 635, a view of the coupled files first file 235 and second file 240 are mapped into the virtual memory 440 at Step 635. At Step 640, the image of the coupled files are looped through in the virtual memory 440, and the first file 235 and the second file 240 are transmitted to the requesting OWS element 217. Either the CFA thread 214 or the CFA request queuing thread 213 closes all open handles, removes the relevant CFA entry from the CFA list, and exits at Step 645. The process is concluded at Step 650.

It should be noted that the processes represented by FIGS. 3B, 4B, 5A, and 6 could be modified or supplanted by other methods without departing from the spirit and scope of the invention as defined by the claims. In fact, modifications and/or other methods will be apparent to routineers after studying and understanding the teachings of the current invention.

File accessing response delays can result in the prior art when a computer network system is composed of a heterogenous mixture of network types as explained above with reference to FIG. 1. With the CFA functionality 212 of the current invention, on the other hand, no response delays will result. Referring again to FIG. 2, network connections 230' and 230''' are defined to represent a WAN and a faster LAN, respectively, so the first client 215 will not be able to transfer data as quickly as the third client 225. Consequently, the first client 215, which has the slower connection to the server 205, may take several minutes to complete a coupled file transfer while the second client 225, which has the faster connection to the server 205, may be able to complete a coupled file transfer in several seconds.

With the current invention, a CFA request by the OWS element 217 of the first client 215 for the first and second files 235 and 240 causes a file mapping to be created in the virtual memory 440 and a CFA thread 214 to be initialized. The individualized memory mapped views of the linked files, in conjunction with the CFA threads 214, reduce network congestion. The server 205 will thus be able to respond to the faster-connected third client 225 at its higher bandwidth speed because the deleterious effects of network bottlenecks are minimized by the current invention.

It should be noted that the third client 225 may access the data in the first and second files 235 and 240 from the same virtual memory mapped view (if, for example, both clients merely wish to read the linked files); however, in a preferred embodiment, each client's request is serviced by creating an individual, instantaneous "snapshot" version of the request files to accommodate file modifications. Hence, while the slower-connected first client 215 is still receiving the coupled files from its memory mapped view, the faster-connected third client 225 can have modified its individual memory mapped view. The first client 215 will continue to receive the "snapshot" of the first and second files 235 and 240 as they existed when its memory mapping occurred.

With regard to data consistency, the last modification is considered the correct version. It should be noted that the current invention can also be advantageously used in conjunction with a network mutex invention that is described in a related U.S. patent application, Ser. No. 09/014,504. This network mutex invention enables network-level mutexes with associated priority levels. The locking of network-level objects can prevent incongruent data.

In conclusion, the current invention provides the following benefits. First, the invention provides the ability for any element on a network to simultaneously transfer two physically different files from a server to a client machine while preventing the mismatching of coupled files. Second, the current invention enables a network to support a heterogeneous fast and slow network environment, e.g., a LAN and a WAN, while optimizing the performance. The first and second benefits were demonstrated in examples described hereinabove.

The current invention, however, advantageously has many other benefits as well. For example, a third benefit of the invention is its ability to bypass or work harmoniously with any security restrictions that the network operating system imposes. On the server side, this is accomplished with the RDS element, which preferably runs as a Windows NT service and has complete access to the server's hard disk. On the client side, this is accomplished with the file access DLL, which can preferably directly communicate with the RDS element on the server.

A fourth exemplary benefit is the ability for any number of elements on the network to concurrently retrieve or store any linked files on the server. This results from the virtual memory file mapping, which occurs for both retrieval and store accesses. Because each CFA request can either share one memory mapped "snapshot" or be assigned its own individual "snapshot," any number of elements can simultaneously access the same linked files.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method in a computer network system for accessing linked files, comprising the steps of:

constructing, at a client, a coupled file access (CFA) request, wherein a plurality of linked files are requested by including at least a first and a second file identifier in said CFA request, the first and second files that correspond to said at least said first and second file identifiers being linked but unbundled;

transmitting said CFA request from said client to a server;

creating a new entry in a CFA list for said CFA request;

determining whether said CFA request should be processed; and processing said CFA request at said server if the step of determining determines that said CFA request should be processed.

2. The method of claim 1, wherein (i) said at least said first and second file identifiers comprise first and second file names and (ii) said first and second files are linked because they have related data but are unbundled because they do not form a compound document.

3. The method of claim 1, wherein the step of constructing further comprises the step of:

attaching a file access priority and a file access communication timeout to said CFA request.

4. The method of claim 1, wherein the step of determining further comprises the step of:

determining whether said client has a different CFA request in progress;

waiting for a predetermined amount of time if said client has said different CFA request in progress; and disregarding said CFA request if said different CFA request is still in progress after said predetermined amount of time has elapsed.

5. The method of claim 1, wherein the step of processing further comprises the step of:

initializing a CFA thread capable of servicing said CFA request.

6. The method of claim 1, wherein the step of creating a new entry comprises the steps of:

entering information from said CFA request;

entering an identifier of said client; and indicating a status of said CFA request.

7. The method of claim 6, wherein the step of indicating a status of said CFA request comprises the step of:

indicating that said status of said CFA request is a ready status.

8. The method of claim 1, wherein the step of processing further comprises the steps of:

selecting said CFA request from said CFA list based on a file access priority of said CFA request; and indicating that said CFA request is in an in progress status on said CFA list.

9. The method of claim 1, wherein the step of processing further comprises the step of:

opening an existing file mapping for at least said first and second files by enabling access of images of said at least said first and second files from a virtual memory.

10. The method of claim 1, wherein the step of processing further comprises the step of:

creating a new file mapping for at least said first and second files by mapping images of said at least said first and second files into a virtual memory.

11. The method of claim 1, further comprising the step of:

providing access, by said server to said client, to said plurality of linked files from a virtual-memory-mapped image of said plurality of linked files.

12. The method of claim 1, further comprising the steps of:

transferring at least said first and second files simultaneously from said server to said client; and wherein the step of constructing a CFA request further comprises the step of constructing a coupled file transfer (CFT) request.

13. A computer accessible memory system for implementing a coupled file access (CFA) in a computer network, the system comprising:

a memory storing a plurality of files, wherein some of said plurality of files are linked, but unbundled, files;

a server associated with said memory for providing access to said plurality of files in response to a CFA request from at least a first remote client, wherein the access provided responsive to said CFA request enables simultaneous access of linked files, said CFA request including at least a first and a second file identifier designating said linked files, said at least said first and second file identifiers corresponding to first and second files, respectively; and a CFA list, said CFA list including a plurality of CFA requests said plurality of CFA requests including said CFA request.

14. The computer accessible memory system of claim 13, wherein (i) said at least said first and second file identifiers comprise at least first and second file names and (ii) said first and second files are linked because they have related data but are unbundled because they do not form a compound document.

15. The computer accessible memory system of claim 13, wherein said CFA request further includes:

a file access priority and a file access communication timeout period for said linked files.

16. The computer accessible memory system of claim 13, wherein said server provides to said first remote client simultaneous access to said plurality of files.

17. The computer accessible memory system of claim 13, wherein said server provides to both said first remote client and a second remote client simultaneous access to said plurality of files.

18. The computer accessible memory system of claim 13, wherein said server further comprises:

a CFA request queuing thread for initializing a CFA thread capable of servicing said CFA request.

19. The computer accessible memory system of claim 13, wherein said server further comprises:

a CFA request queuing thread for creating a new entry in said CFA list for said CFA request.

20. The computer accessible memory system of claim 19, wherein said new entry includes:

information from said CFA request;

an identifier of said first remote client; and a ready status indication.

21. The computer accessible memory system of claim 13, wherein said server further comprises:

means for opening an existing file mapping for at least said first and second files by enabling access of images of said at least said first and second files from a virtual memory.

22. The computer accessible memory system of claim 13, wherein said server further comprises:

a virtual memory for receiving a new file mapping for at least said first and second files when either (i) no previous CFA request has requested said first and second files or (ii) said CFA request is a modification request.

23. The computer accessible memory system of claim 13, further comprising:

a virtual memory having a first file mapped image from a first CFA request from said first remote client and a second file mapped image from a second CFA request from a second remote client; and wherein said server provides simultaneous access for said first and second remote clients to said first and second file mapped images.

24. A computer accessible memory system for implementing a coupled file access (CFA) in a computer network, the system comprising:

a memory storing a plurality of files, wherein some of the plurality of files are linked files;

a server associated with said memory for providing access to said plurality of files in response to a CFA request from a first remote client, wherein the access provided by said CFA request enables simultaneous access of linked files;

a virtual memory having a first file mapped image from a first CFA request from said first remote client and a second file mapped image from a second CFA request from a second remote client; and wherein said server provides simultaneous access for said first and second remote clients to said first and second file mapped images and simultaneous transmissions to said first and second remote clients at a first bandwidth appropriate for said first remote client and at a second bandwidth appropriate for said second remote client, respectively.

25. A method for accessing a plurality of linked files substantially simultaneously in a computer network system, comprising the steps of:

receiving a coupled file access (CFA) request;

adding a new CFA entry for said CFA request in a CFA list;

inspecting at least one entry of said CFA list;

selecting said at least one entry responsive to said step of inspecting;

attempting to open an existing file mapping corresponding to said at least one entry;

if said existing file mapping is opened in said step of attempting, then transmitting a plurality of files in accordance with said at least one entry; and if said existing file mapping is not opened in said step of attempting, then creating a new file mapping for said plurality of files in accordance with said at least one entry and subsequently transmitting said plurality of files in accordance with said at least one entry.

26. The method of claim 25, wherein said CFA request includes first and second identifiers of first and second files, respectively.

27. The method of claim 26, wherein said first and second files comprise interdependent data.

28. The method of claim 25, wherein said new CFA entry includes an identifier of a requesting client, a priority indicator, and a request status.

29. The method of claim 28, wherein said step of inspecting at least one entry of said CFA list comprises the step of inspecting said request status of said at least one entry.

30. The method of claim 29, wherein said step of selecting said at least one entry responsive to said step of inspecting comprises the steps of (i) selecting said at least one entry if said request status of said at least one entry comprises a ready status and (ii) changing said request status of said at least one entry to an in progress status thereafter.

31. The method of claim 25, wherein said step of creating a new file mapping for said plurality of files in accordance with said at least one entry comprises the step of mapping copies of at least a first file and a second file corresponding to said at least one entry into virtual memory.

32. The method of claim 25, further comprising the step of transmitting said plurality of files to a first client and a second client substantially simultaneously, but at differing data transfer rates, from said file mapping or said new file mapping.

\* \* \* \* \*